United States Patent
Boezeman et al.

(10) Patent No.: US 6,263,486 B1
(45) Date of Patent: *Jul. 17, 2001

(54) METHOD AND SYSTEM FOR DYNAMIC CONNECTIONS WITH INTELLIGENT DEFAULT EVENTS AND ACTIONS IN AN APPLICATION DEVELOPMENT ENVIRONMENT

(75) Inventors: John Junior Boezeman, Apex; Michael David Harris, Durham; Carol Ann Jones, Raleigh; Christopher Joseph Paul, Durham, all of NC (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/755,421

(22) Filed: Nov. 22, 1996

(51) Int. Cl.[7] ............................................. G06F 9/45
(52) U.S. Cl. ................................... 717/1; 717/11
(58) Field of Search ................................. 395/701–703, 395/700, 683; 345/435, 326; 706/47; 717/1, 11

(56) References Cited

U.S. PATENT DOCUMENTS

| | | | |
|---|---|---|---|
| 5,386,568 | * | 1/1995 | Wold et al. ............................ 717/10 |
| 5,485,617 | * | 1/1996 | Stutz et al. ........................... 709/303 |
| 5,487,141 | * | 1/1996 | Cain et al. ............................ 395/135 |
| 5,537,630 | * | 7/1996 | Berry et al. ........................... 345/326 |
| 5,546,519 | * | 8/1996 | Berry .................................... 395/155 |
| 5,751,914 | * | 5/1998 | Coley et al. ........................... 706/47 |

OTHER PUBLICATIONS

Arnaud. Dynamic Message Passing in C++. Dr. Dobb's Journal, vol. 21, No. 8, Abstract, Aug. 1996.*

* cited by examiner

Primary Examiner—Mark R. Powell
Assistant Examiner—Wei Zhen
(74) Attorney, Agent, or Firm—A. Bruce Clay; Myers Bigel Sibley & Sajovec. P.A.

(57) ABSTRACT

A plurality of object oriented parts are automatically interconnected on a computer system. A user selects at least two of the parts for interconnection. Default actions and events are automatically selected for each object, and the connection therebetween is made.

9 Claims, 7 Drawing Sheets

METHOD AND SYSTEM FOR DYNAMIC CONNECTIONS WITH INTELLIGENT DEFAULT EVENTS AND ACTIONS IN AN APPLICATION DEVELOPMENT ENVIRONMENT

TECHNICAL FIELD OF THE INVENTION

The present invention relates in general to computer software, and in particular, to a method and system for dynamic connections with intelligent default events and actions.

BACKGROUND OF THE INVENTION

Application development tools are frequently provided to program developers to make the job of programming simpler and more efficient. A technique that has been developed to assist novice and intermediate programmers using such tools, such as VisualAge for Smalltalk from International Business Machines Corp. and PowerBuilder from Sybase Inc., has been the concept of visual programming from parts. In addition to the underlying programming language, such tools provide a selection of pre-built software parts or components presented to a software developer via an icon in a graphical user interface together with an open work space. By simply selecting one of the icons and dragging it into the work space, the developer in effect programs an application that the developer is creating to include the code for the function of the part or component which the icon represents.

Programming from parts is especially effective for developing graphical user interfaces for software applications being created, but is also employed for adding many types of functions to applications such as communication, database access, multimedia, etc.

Application developers utilize multimedia systems to create programs that allow end users to view a multimedia presentation and manipulate various controls. In a construction-from-parts development tool environment, parts need to be connected via an event to other parts to perform actions. For example, a button part's "clicked" event connected to a videoplayer's "play" action—so that when the button is clicked, the video plays. Traditionally, this connection is accomplished via an editor or dialog window requiring the user to make multiple choices/selections to connect the parts. In addition to being time-consuming, this routine must be followed for each connection desired to the last detail.

One product attempting to deal with event connections is Director from Macromedia. Director specifies time on a frame based metaphor. A Score is used in Director to specify when things occur in a movie (or title). The Score is a sequence of frames that hold cells of an animation and the indication to start playing audio or video. Things are specified linearly in Director. Frames are sequenced in order unless software code is written to manually go back to a previous frame. Frames show sequentially one after the other. To control a video player interactively, a special "interactive" track is used. A frame is specified in this track to wait for a mouse click before proceeding to play the video.

Another product, VisualAge from IBM, is a client/server application development tool. It has a facility, called the Composition Editor, where objects are connected by drawing lines between them. This tool allows events from any object to trigger actions of any other object, and the lines drawn between the objects visually indicated that such a relationship exists. However, the process to create these lines require numerous steps and the line drawing gives no information about the order of the connections. As the line drawing becomes more complex (interconnection of many parts), it becomes more and more difficult to understand.

Finally, IconAuthor (IA) is a multimedia authoring tool which allows creation of applications that include time-based media, logic, database, etc. IA uses a flowchart metaphor to specify an application. Icons representing the playing of media, database access, comparisons, assignment, etc. are taken from a palette and connected into a flowchart. Processing in the application then follows the hierarchical structure defined in the flowchart. There is no editor to synchronize processing visually. Synchronization is done by checking logic and by corresponding logic that responds to events.

Thus, there is a need for a method and system that simply and visually provides dynamic connections with intelligent default events and actions.

SUMMARY OF THE INVENTION

The present invention disclosed herein comprises a method and system for a dynamic connections with intelligent default events and actions in a multimedia application development environment which substantially eliminates problems associated with prior multimedia editors. The present invention allows a developer to link the events of one object to the actions of another object in a user friendly graphical interface.

In accordance with one aspect of the invention, a method of interconnecting a plurality of object oriented parts on a computer system is provided. A user selects at least two parts for interconnection using a pointing device. Default actions and events are automatically selected for each of the parts to complete the interconnection.

BRIEF DESCRIPTION OF THE DRAWINGS

For a more complete understanding of the present invention and for further advantages thereof, reference is now made to the following Detailed Description, taken in conjunction with the accompanying Drawings, in which.

DETAILED DESCRIPTION OF THE INVENTION

Figure 1:
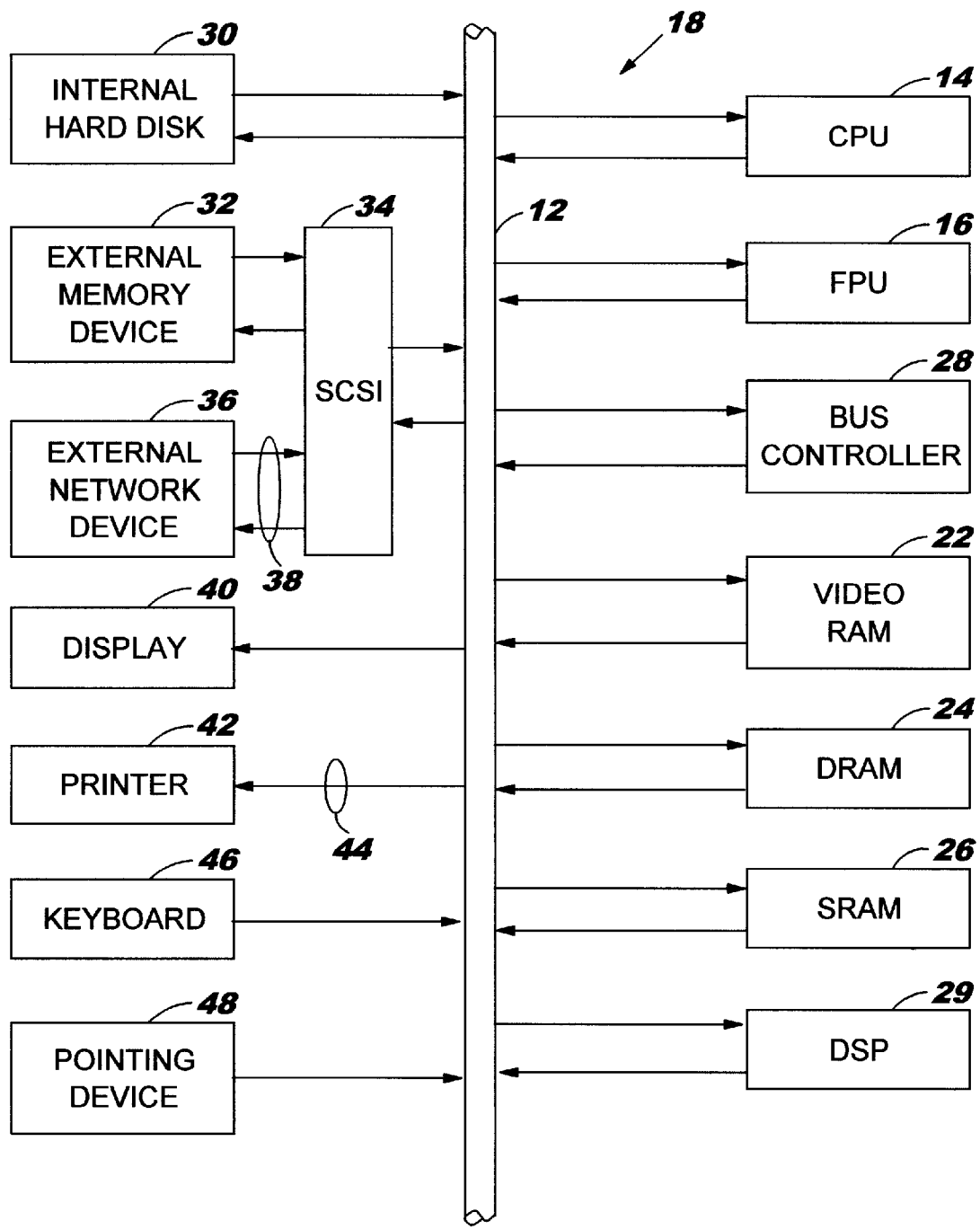
FIG. 1 is an illustration of a general computer architecture of a computer system within which the present invention may operate.

Referring first to FIG. 1, there is shown a general architecture 18 of a system of the type within which the present invention operates. Architecture 18 comprises a main bus 12, which serves to interconnect the various components, including at least some of the following (and possibly other additional components): CPU 14, flowing point unit 16, bus controller 28, video RAM 22, dynamic RAM 24, static RAM 26, digital signal processor 29, internal hard disk 30, external memory device 32 (connected for example via a SCSI port 34), external network device 36 (communicating for example over an ethernet network 38, and connected via SCSI port 34), a display device 40 (such as a CRT), printer 42, keyboard 46, and pointing device 48 (such as a mouse, track ball, etc.). The interconnection and functioning of each of these components in an operating computer system are well known in the art. However, the function and significance of particular components will be discussed in further detail where appropriate.

While the discussion that follows describes the invention in terms of the software programming environment commonly known as object oriented software design (such as Java from Sun Microsystems), it will be appreciated that the functionality of the present invention is not limited to such environments. However, as support for one possible environment in which the program invention operates, a description of certain relevant details of object oriented programming environments is presented.

In an object oriented programming language, the fundamental data structures of the language are objects, programming elements that contain a specification of data, actions and events. Data is specified in local variables, referred to as instance variables, contained within the object. Actions, or methods, are sub-programs that operate on the variables. Methods are invoked by messages sent from one object to itself or other objects. Events are notifications from the object to other objects that something noteworthy has occurred. For example, a button object can notify other objects that it has been activated. This notification is called a "clicked event."

There are two fundamental object constructs: classes and instances. Classes have a set of variables and methods and can be thought of as templates for object types. Instances (or objects) are particular run-time instantiations of a class. An object provides storage for variables defined in its class. Each instance has its own version of those variables. When a message is sent to an object, the object looks to methods defined in its class to determine how the message is to be executed.

Classes are defined in terms of a class hierarchy. A class inherits all variables and methods from classes higher in the hierarchy, referred to as superclasses. The inheriting class may be referred to as a subclass or child of the superclass. The variables and methods inherited from a superclass are available to the inheriting class as if they were defined within the inheriting class. Note that if a subclass has multiple superclasses, all the variables and methods from each superclass are inherited. This is often referred to as multiple inheritance.

There are two types of variables that may be defined within a class. The first are class variables, whose storage is shared by all instances of the defining class. Class variables are typically used for coordination between classes and instances. The second are instance variables, which are variables specific to each particular instance. That is separate storage space is allocated to each instance variable of each instance.

Methods specify the action to be performed when a message is sent to an object. When the message is sent to an object, the message name is matched against method names defined for that object. The method actually executed is the method with the same name as the message that is defined lowest in that object's class hierarchy.

Messages can have parameters. When a message is sent, all actual parameters are fully evaluated before a method is located for that message. Methods have formal parameters, corresponding to the actual parameters in the message, and temporary variables. Temporary variables may be created when the message is executed, and are available only with the scope of that method while the method is executing.

Programs perform by sending messages to objects which invoke a method in an object's class or class hierarchy.

Often, methods send messages to other objects, invoking other methods. Typically, each method returns a result to the sender. At the heart of many languages, and especially an object oriented language, is a program segment for interpreting and evaluating messages and keeping track of where to return when methods call other methods.

Object oriented programming environments can be implemented with many programming languages. Some common examples of object oriented environments are: the C++ environment, the Smalltalk environment, and the Java environment.

Software program code which employs the present invention is typically stored in memory, such as the internal hard disk 30, from which a developer may access the code. For distribution purposes, the software program code may be embodied on any of a variety of known media for use with a data processing system, such as a diskette or CD-ROM, or may be distributed over a network of some type to other computer systems for use by users of such other systems. Such techniques and methods for embodying software code on media and/or distributing software code are well known and will not be further discussed herein.

The present invention will now be discussed in conjunction with reference to FIGS. 2–17. As previously stated, one of the problems facing the creators of applications is the need to specify application logic in an easy, intuitive way, without requiring software code to be written.

Figure 2:
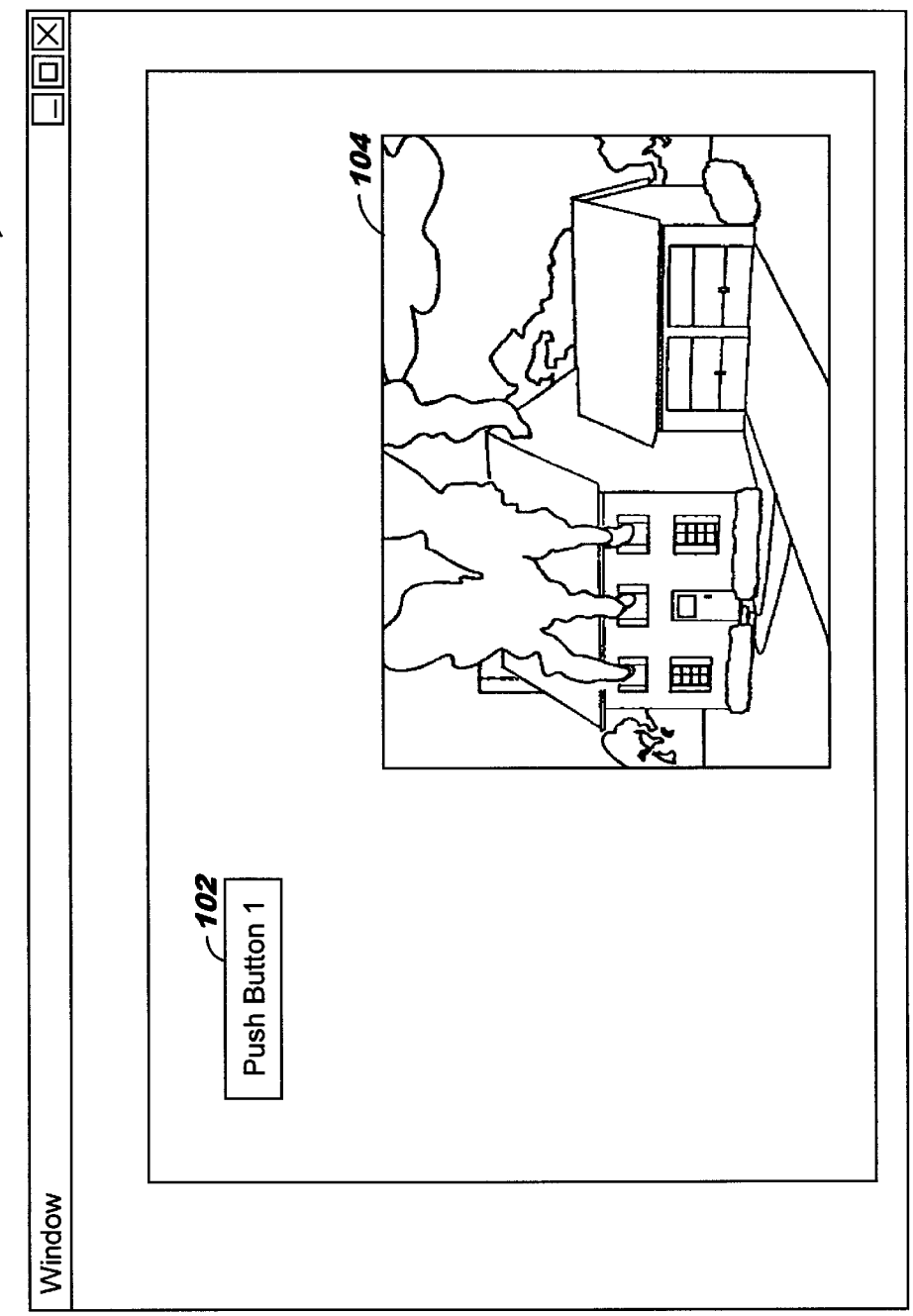
FIGS. 2–7 are graphical illustrations of a connection editor in accordance with the prior art.
Figure 3:
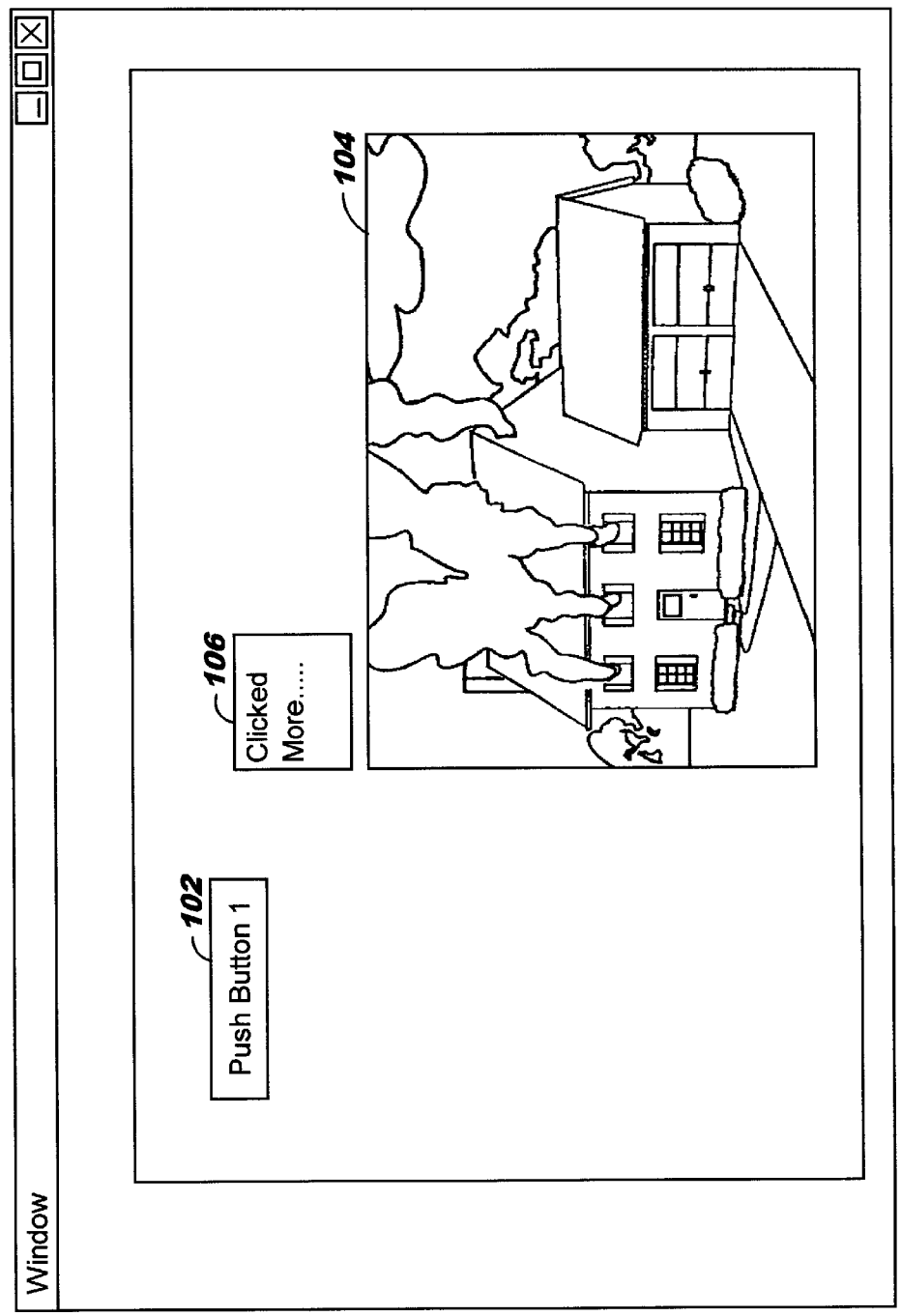
Figure 4:
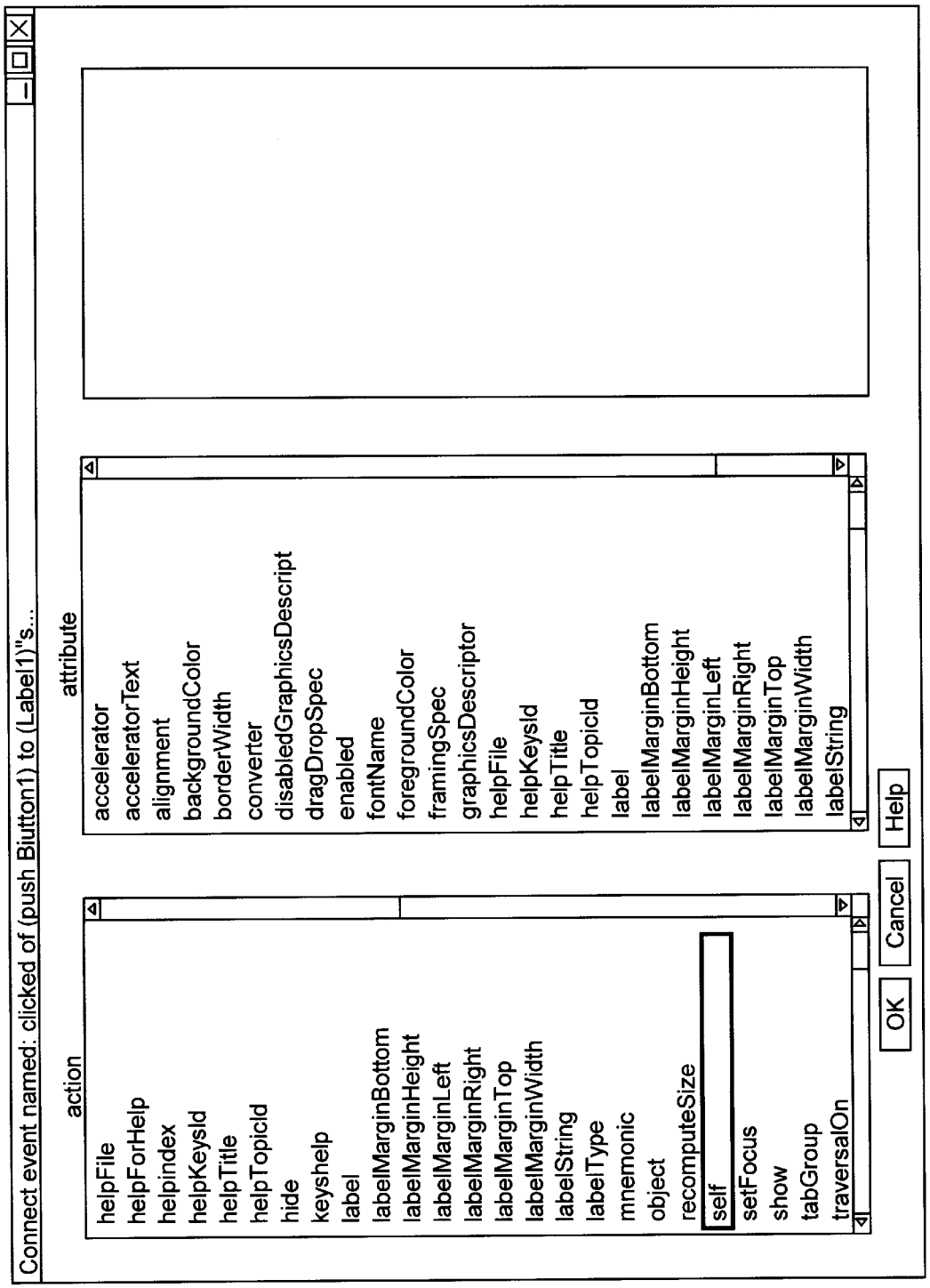

Referring first to FIGS. 2–7, an example illustrating the prior art is shown. FIG. 2 shows a commonly known tool such as, for example, VisualAge from IBM or Parts from ParcPlace, for connecting parts in an application. Within the window 100 there is a push button 1 part 102 and a video part 104. To connect the two parts, a user must first click on the part 102 with a right mouse button. Upon doing so, a pop-up menu 106 (FIG. 3) is displayed adjacent the part 102. The menu 106 may contain events such as "clicked" and "more." If "more" is selected, a dialog 108 (see FIG. 4) is opened. The dialog 108 contains a complete listing of all the selectable events for use with the part 102.

Figure 5:
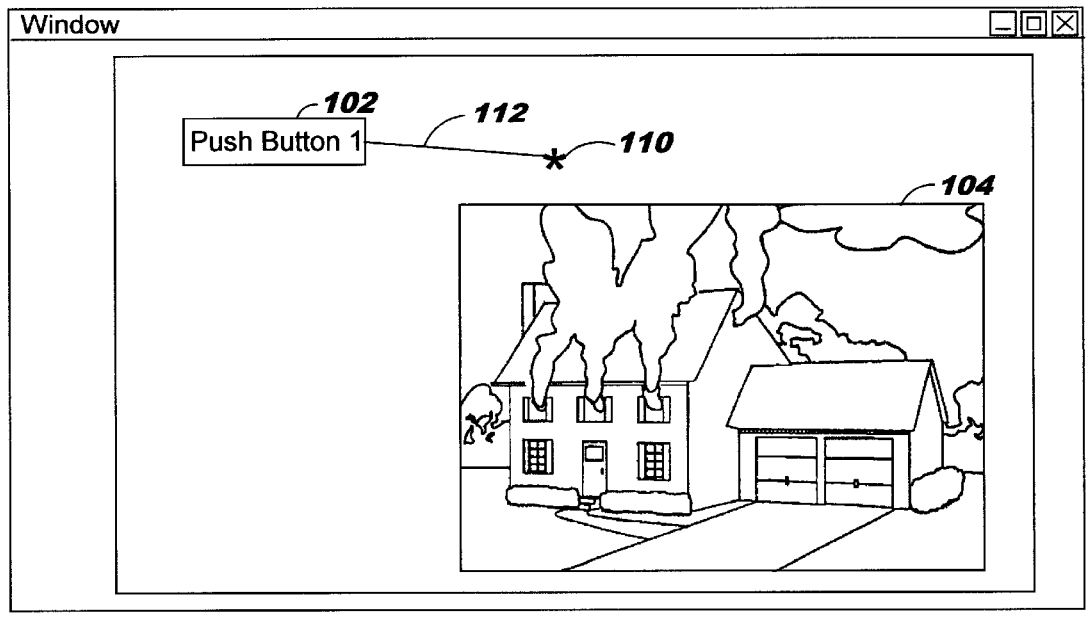
Figure 6:
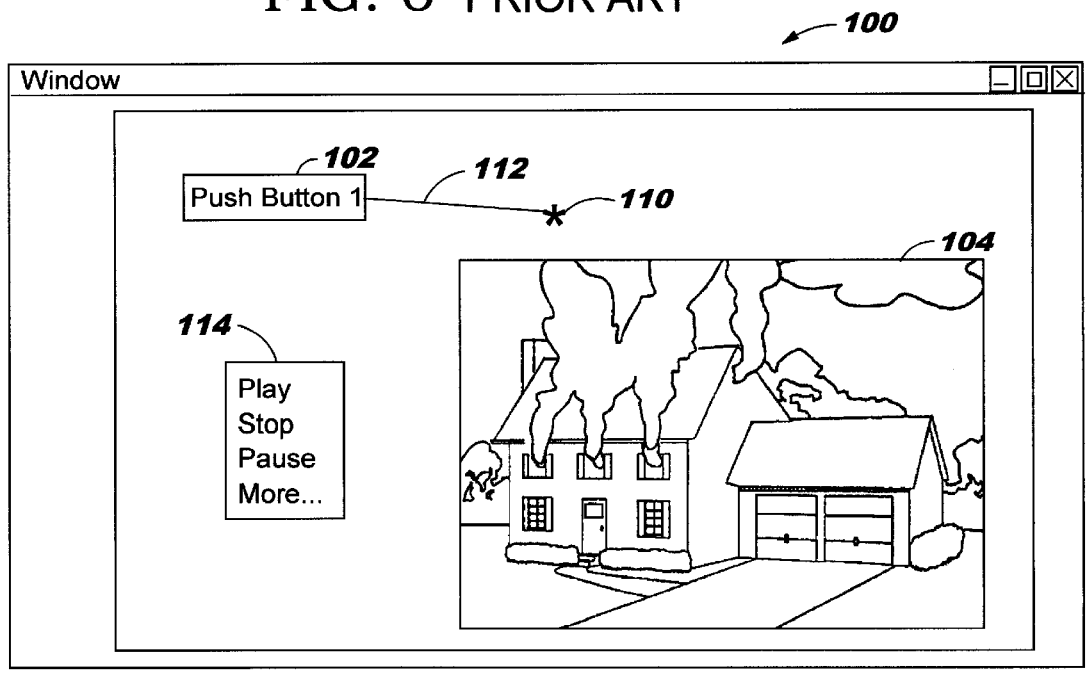
Figure 7:
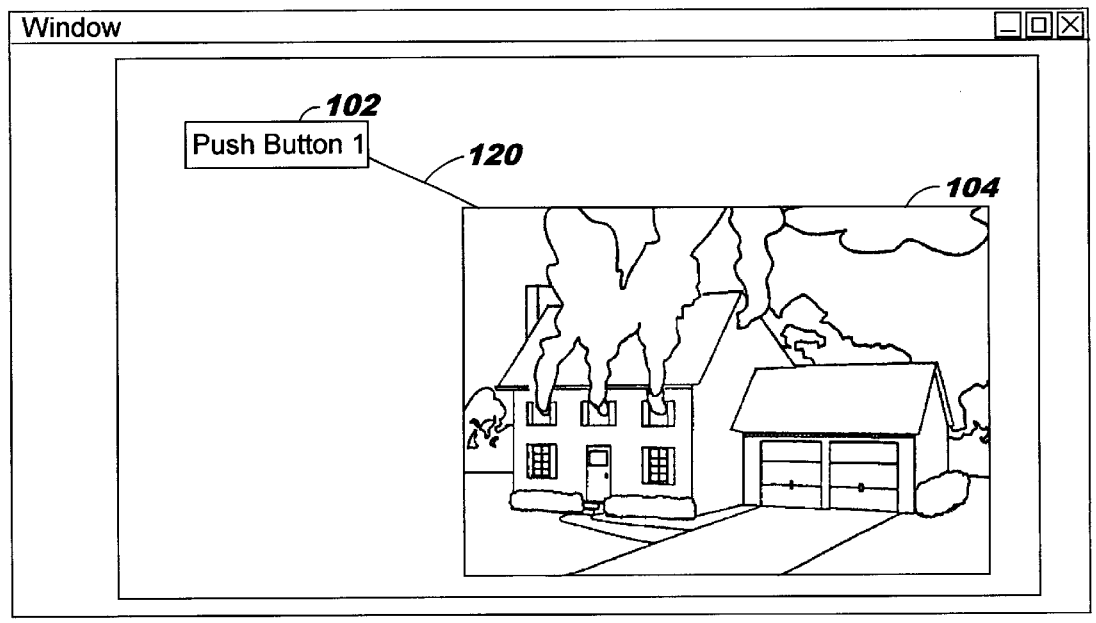

The user selects "clicked" from the menu 106 in order to activate the part 102 upon happening of the "clicked" event. Referring to FIG. 5, the cursor is changed to, for example, an asterisk 110, to show a pending connection. In addition, a line 112 is drawn from the part 102 to the asterisk 110.

At this point, the user must click on the second part (video part 104) with the left mouse button. A second pop-up menu 114 (FIG. 6) is then displayed listing the most common actions associated with that part. The user selects one of the listed actions or "more" to get a dialog, such as previously described above with reference to FIG. 4. Upon selection of the desired action, a line 120 (FIG. 7) is drawn to connect the part 102 with the part 104. Thus, it can be seen that the typical prior art connection methods can be quite lengthy and complicated.

Figure 8:
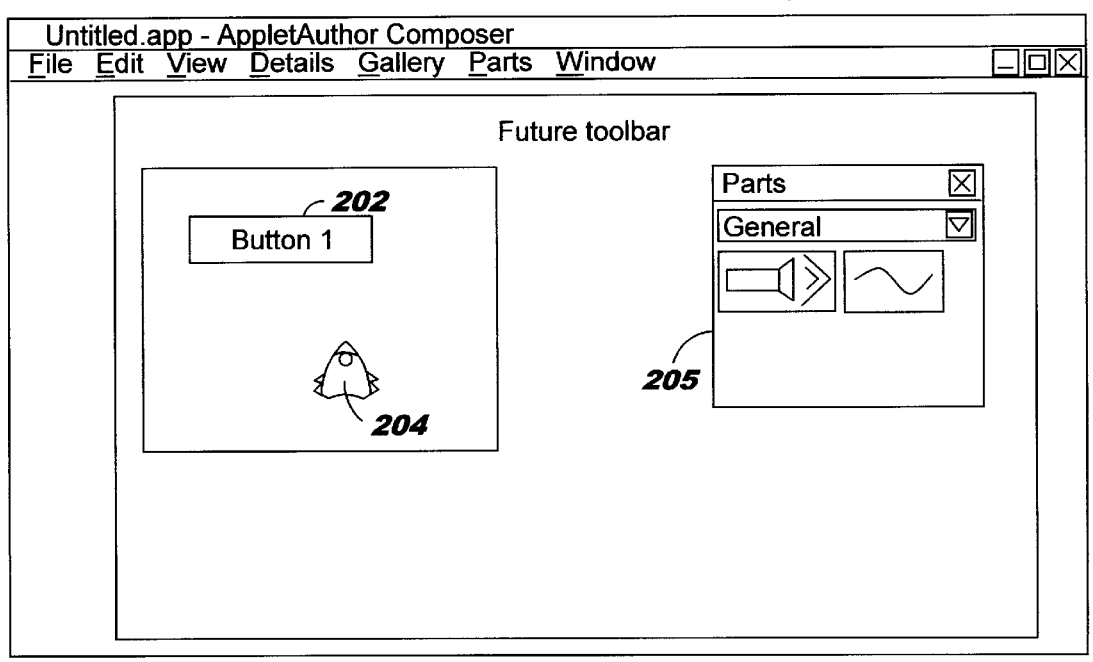
FIGS. 8–9 illustrate a connection editor in accordance with the present invention.
Figure 9:
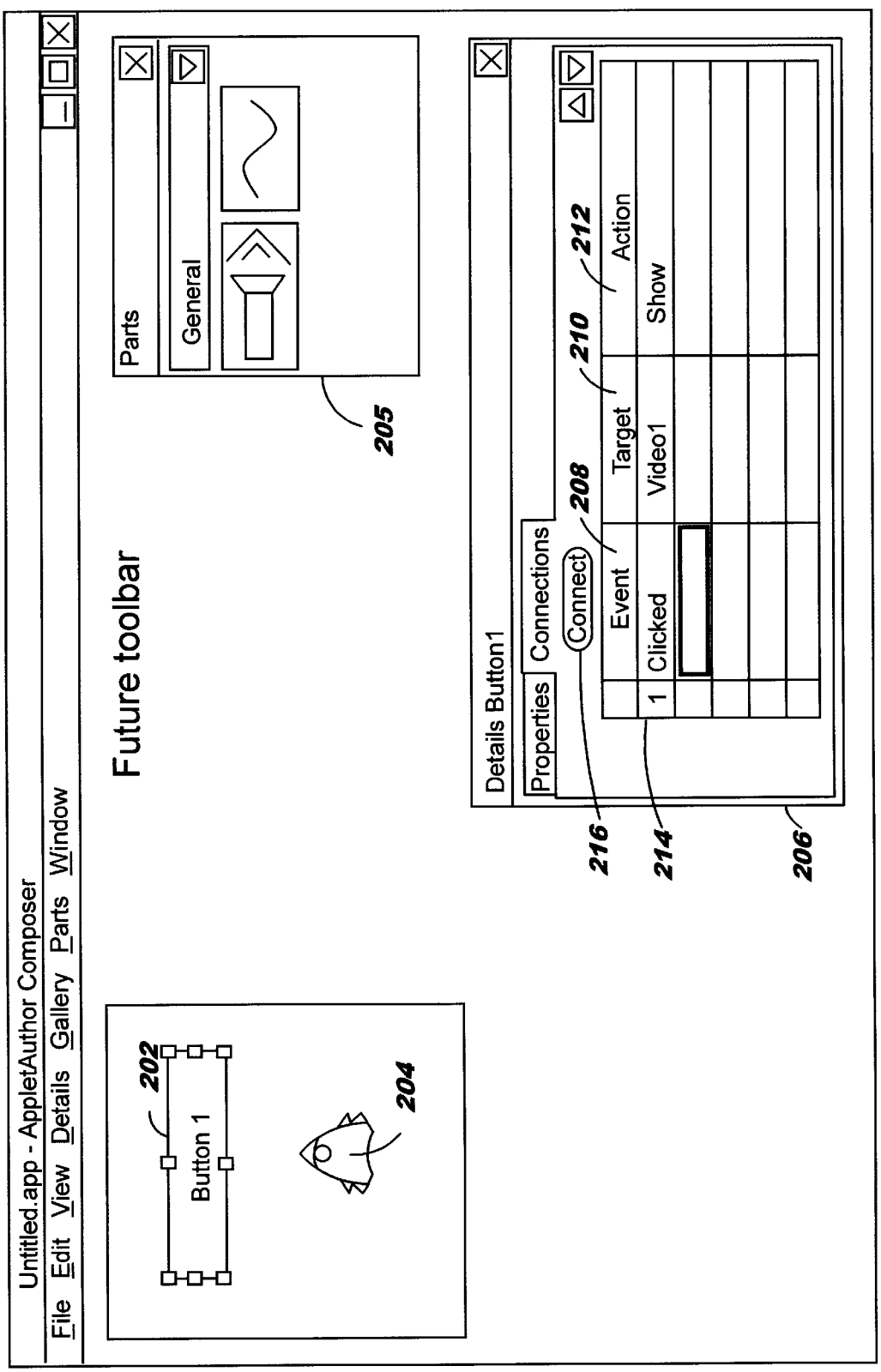

Referring now to FIGS. 8 and 9, the method of the present invention is illustrated. Referring first to FIG. 8, a window 200 (similar to the window 100, as described above) displays a "Button 1" part 202 and a "video" part 204, each of which have been dragged and dropped from a parts palette 205. In order to connect the two parts, a user holds down a preselected key, for example, the "control" key and clicks on each of the parts 202 and 204. Upon doing so, a "Connections" window 206 (FIG. 9) appears.

The "Connections" window 206 has a plurality of rows and columns for entry of appropriate information. For example, the window 206 is shown with three columns entitled "Event" 208, "Target Part" 210 and "Action" 212. Under the columns are rows for the automatic entry of selected parts. As shown, a row 214 contains "Clicked" under "Event" 208, "Video 1" under "Target Part" 210 and "Show" under "Action" 212. The row 214 is automatically filled in to reflect the most likely default event, part and action. If the defaults are not what the user wants, they may be changed by clicking on the appropriate cell to obtain a list of selectable alternatives. Thus, the connection is made between the parts by merely selecting them rather than the multi-step procedure required by the prior art.

In order to connect more than two parts, a preselected key, for example, the shift key is depressed while clicking on the desired parts. Upon appearance of the window 206, the user selects a "Connect" button 216. A row is then automatically filled in as described above for each selected part (except the first selected part which is considered to be the source while all others are considered to be targets).

Thus, the present invention provides heretofore unavailable simplicity of use for an internet application developer. The developer has all the tools necessary to create an internet application in an easy to use visual interface type application. Parts can be connected using events and actions. The connection editor provides simple interactive techniques for connecting parts and understanding their relationships at a glance.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A method of interconnecting a plurality of object oriented parts on a computer system, comprising the steps of:

accepting user input to activate an interconnection mode;

accepting user input that clicks on at least two of the object oriented parts for interconnection while in the interconnection mode such that all objects which are clicked on while in the interconnection mode are objects which are to be interconnected;

selecting the at least two of the object oriented parts for interconnection based on the accepted user input wherein only the object oriented parts which are to be interconnected are selected; and automatically selecting default actions and events for each of said selected object oriented parts in order to complete said interconnection.

2. The method of claim 1, further comprising the step of:
modifying said default actions and events as desired.

3. The method of claim 2, wherein said step of modifying further comprises:

selecting any of said default actions and events; and selecting a replacement from a predetermined list.

4. A system for interconnecting a plurality of object oriented parts on a computer system, comprising:

means for accepting user input to activate an interconnection mode;

means for accepting user input that clicks on at least two of the object oriented parts for interconnection while in the interconnection mode such that all objects which are clicked on while in the interconnection mode are objects which are to be interconnected;

means for selecting the at least two of the object oriented parts for interconnection based on the accepted user input wherein only the object oriented parts which are to be interconnected are selected; and means for automatically selecting default actions and events for each of said selected object oriented parts in order to complete said interconnection.

5. The system of claim 4, further comprising:

means for modifying said default actions and events as desired.

6. The system of claim 5 wherein said means for modifying further comprises:

means for selecting any of said default actions and events; and means for selecting a replacement from a predetermined list.

7. A computer program product recorded on computer readable media for interconnecting a plurality of object oriented parts on a computer system, said product comprising:

computer readable means for accepting user input to activate an interconnection mode;

computer readable means for accepting user input that clicks on at least two of the object oriented parts for interconnection while in the interconnection mode such that all objects which are clicked on while in the interconnection mode are objects which are to be interconnected;

computer readable means for selecting the at least two of the object oriented parts for interconnection based on the accepted user input wherein only the object oriented parts which are to be interconnected are selected; and computer readable means for automatically selecting default actions and events for each of said selected object oriented parts in order to complete said interconnection.

8. The computer program product of claim 7, further comprising:

computer readable means for modifying said default actions and events as desired.

9. The computer program product of claim 8, wherein said computer readable means for modifying further comprises:

computer readable means for selecting any of said default actions and events; and computer readable means for selecting a replacement from a predetermined list.

* * * * *